April 25, 1950

E. O. HULBURT 2,504,981

VISIBILITY METER

Filed Aug. 8, 1946

Inventor
EDWARD O. HULBURT

By M. O. Hayes

Attorney

Patented Apr. 25, 1950

2,504,981

UNITED STATES PATENT OFFICE 2,504,981

VISIBILITY METER

Edward O. Hulburt, Alexandria, Va.

Application August 8, 1946, Serial No. 689,134

5 Claims. (Cl. 250—83.6)

(Granted under the act of March 3, 1883, as amended April 30, 1928; 370 O. G. 757)

This invention relates to visual range meters, and has particular reference to a device for the determination of visual range through use of a projector of invisible electromagnetic radiations combined with a detector therefor.

An object of the present invention is to provide a device capable of shipborne or airborne use which will objectively determine visual range at all times of day and under all weather conditions.

Another object of the invention is to provide an apparatus which will determine visual range by the use of invisible radiations, thus enabling it to be operated at night with a maximum of security aboard military ships and aircraft.

Another object of the present invention is to provide an apparatus which may be used at airports and aircraft landing areas to determine in an accurate manner the "ceiling" or upper limit of visibility.

Other objects and advantages of our invention will in part be obvious and in part appear hereinafter.

In the navigation of ships and aircraft, as well as in the early detection of other ships and aircraft it is important to ascertain the range of optical visibility under the varying weather conditions which may prevail. While such visibility may be estimated by optical means alone, such methods become unreliable at night and under conditions in which no comparison standard is available, such as another ship or aircraft of approximately known distance. At such times it is particularly important that some objective means be provided, in order that a "zone of safety" be determined and a navigable speed be set.

A device for the objective determination of visibility may be made to comprise a radiation source, and means for measuring the radiation scattered by the dust and moisture particles in the atmosphere. While such radiation may consist of visible light it is preferable to use somewhat shorter wavelengths of the order of 2900 Angstroms or less, since less interference will be encountered from the sunlight at these wavelengths. Ultraviolet radiation possesses very favorable attributes for this application since it is substantially similar to visible radiation insofar as its reflection and scattering by dust, fog, or haze is concerned. Ultraviolet radiation is furthermore capable of the same optical treatment as visible light insofar as the generation and focusing of a projected beam is concerned.

Accordingly the invention comprises a radiation projector for invisible radiation of the order of 2900 Angstroms wavelengths or less which may be provided with a filter to limit the type of radiation, in combination with a Geiger-Mueller counter tube sensitive to these radiations and so placed in relation to the projector that it receives only the radiations reflected from dust and haze particles in the atmosphere. Coupled with the Geiger-Mueller counter tube itself is a counting circuit and indicator designed to receive the pulses produced by the counter tube, to count them, and to indicate the average number of pulses per second, which indication may be calibrated to give a direct reading of the visual range.

The fact that the counter tube produces pulses is due in no wise to a pulsation in the reflected radiation, since the latter is steady and non-intermittent. The inherent characteristics of the Geiger-Mueller counter tube are such that between the time that a discharge is started by an ionization of the gas within the tube and the time that the internal or external quenching means have operated to prepare the tube for its next discharge, a "dead time" occurs in which the tube does not indicate the presence of an ionizing medium.

For a better understanding of the present invention, reference may be had to the accompanying drawings wherein.

Figure 1:
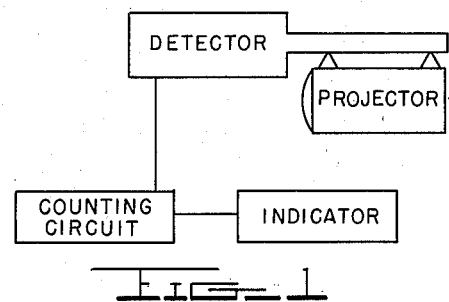
Figure 1 is a block diagram showing the interrelationship of component parts of the apparatus described in this invention.

The basic arrangement of parts, as shown in Figure 1 comprises a projector which is so designed that it transmits a beam of ultraviolet radiation of wavelengths of 2900 Angstroms or less in a controllable direction. A primary source of such radiation may be an incandescent lamp, an arc lamp, or a radiation emitter of the vapor excitation type such as the mercury vapor lamp. The source should preferably be rich in ultraviolet radiation and of an adequate output to provide a proper amount of reflected radiation to be detected by the Geiger-Mueller tube. Since many radiation sources produce considerable visible light it is necessary, in most cases, to use an ultraviolet filter in conjunction with the radiation source so as to eliminate the visible components and to narrow the radiation spectrum in order to prevent interference from the sun and other sources of extraneous electromagnetic waves which may act upon the detecting tube.

Figure 2:
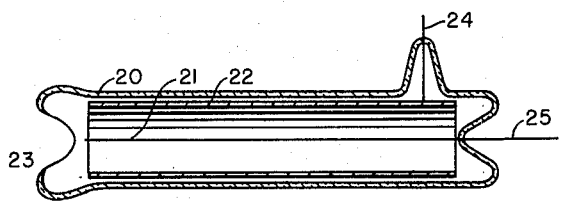
Figure 2 is a schematic diagram of a preferred form of Geiger-Mueller counter tube for use as the ultraviolet sensitive detecting element.

The detecting element comprises a Geiger-Mueller counter tube, an embodiment of which is shown in Figure 2. The tube comprises a glass envelope, 20, within which is a wire anode, 21, surrounded by a cylindrical cathode, 22 made of a metal such as an alkali metal, which is particularly sensitive to ultraviolet radiations. The window, 23, is of some material such as quartz which is highly permeable to these radiations. Electrical connections are made through leads 24 and 25. The interior of the counter tube contains an inert gas, such as krypton, and, for fast counting action, some organic vapor such as methylene bromide or ethyl alcohol which is capable of quenching or deionizing the tube in a very short time following the initial ionizing action. A filter may be combined with the detector tube so that the latter responds only to the range of radiations emitted by the projector. By the use of such a filter the tube is rendered sensitive to the same radiations as are being projected, as a consequence of which interference due to solar radiation and extraneous sources is reduced to a minimum.

Coupled with the Geiger-Mueller counter tube is an electronic counting circuit producing an output voltage proportional to the numbers of pulses produced by the counter. This rate at which pulses are produced is proportioned to the intensity of the steady radiation causing ionization within the tube, and the pulsing is due to successive ionization and quenching of the tube.

The indicating circuit produces a reading, therefore, which is proportional to the average rate at which the tube is counting. Since, in the operation of this apparatus, a direct relationship exists between the intensity of reflected radiation from dust and fog particles and the counting rate of the Geiger-Mueller tube the indicator may be calibrated to read directly in yards or miles of optical visibility.

Figure 3:
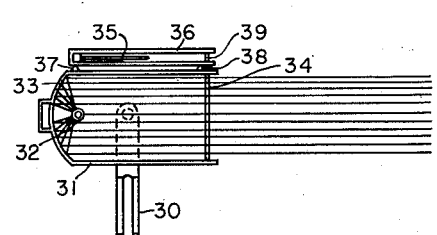
Figure 3 is a diagram showing the arrangement of an embodiment of the projector-detector unit for this invention.

The specific embodiment of the component parts of this invention will depend upon the particular application for which it is to be adapted. In Figure 3 is shown one arrangement of a combined projector-detector unit in which the Geiger-Mueller counter tube is rigidly attached to the projector unit and so oriented that its axis of sensitivity is at all times directed parallel to the beam from the projector. The combined unit, supported by frame 30, comprises a projector housing 31 containing a source of radiation 32 and reflecting means 33. Filter 34 is located in the projected beam. The Geiger-Mueller counter tube, 35, is mounted in a shielded housing, 36, which is affixed to the projector by braces 37 and 38. A filter, 39, may be located in the tube so as to limit the radiations reaching the detector.

Figure 4:
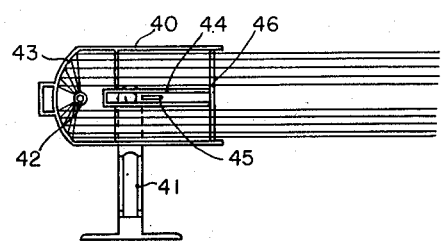
Figure 4 is a diagram showing a structural modification of the projector-detector unit.

Figure 4 shows a modification of this arrangement in which the detector is mounted within the projector housing and may use the same filter. The projector-detector unit 40 is supported by frame 41 and comprises a source of radiation 42 and reflecting surface 43. Mounted concentrically with the axis of the transmitted beam is a housing 44 containing the Geiger-Mueller counting tube 45. The filter 46 may be used for both projecting and detecting elements.

In the operation of our invention it must be realized that while a direct correlation exists between the reflectivity of the atmosphere and the number of counts on the indicator there must be an empirical calibration of each particular modification of the apparatus. It will further be apparent that the uncorrected readings obtainable at daytime and at night will be different because of the effect of solar radiation. Therefore a zero setting of the indicator must be made with the projector off, and when the radiation source is turned on, the reading obtained may be assumed to be a direct result of the radiation reflected from the atmosphere.

The device may be installed aboard ships where it would be highly useful for determining visibility conditions, particularly at night. It has widespread application as an airborne device for navigational use and as a means, when carried aboard search aircraft, for determining the visible range within which an object may be sighted. The apparatus described herein may further be used as a means for determining the "ceiling" or upper visibility limit at a landing field, which information is required at frequent intervals in evaluating flying conditions at a given locality.

It will be apparent to one skilled in the art that this invention is by no means limited to the particular embodiments shown and described, but that many modifications may be made without departing from the scope of this invention as set forth in the appended claims.

The invention described herein may be manufactured and used by or for the Government of the United States of America for governmental purposes without the payment of any royalties thereon or therefor.

What is claimed is:

1. A method for the determination of visible range in the atmosphere comprising, projecting non-intermittent electromagnetic radiation of less than about 2900 Angstroms wavelength into the atmosphere, detecting the reflected radiation, and indicating the amount of said reflected radiation in terms of visible range.

2. A method of determining visible range in the atmosphere comprising, projecting non-intermittent electromagnetic radiation of less than about 2900 Angstroms wavelength into the atmosphere, detecting radiation reflected from suspended solid and liquid particles in the air with a Geiger-Mueller counter, and converting the signal from said detection into a sensible indication of the intensity of said reflected radiation in terms of visible range.

3. A method of determining visible range in the atmosphere comprising, projecting filtered non-intermittent electromagnetic radiation of less than about 2900 Angstroms wavelength into the atmosphere, detecting radiation reflected from suspended solid and liquid particles in the air with a Geiger-Mueller counter after re-filtering, and converting the signal from said detection into a sensible indication of the intensity of said reflected radiation in terms of visible range.

4. An apparatus for the determination of visible range in the atmosphere comprising means for projecting non-intermittent electromagnetic radiation of wavelenth less than about 2900 Angstroms into the atmosphere, means sensitive to said radiation comprising a Geiger-Mueller counter tube oriented to receive only atmospherically reflected radiation, rather than direct radiation, from the projecting means, a counter circuit for producing a voltage proportional to the average number of pulses per unit time produced by said Geiger-Mueller counter, and indicating means operated by said output voltage calibrated in distance of optical visibility.

5. The method of determining range of visibility in the atmosphere which comprises, projecting light rays of less than 2900 Angstroms only, detecting the reflected radiation, and indicating the amount of said reflection in terms of visible range.

EDWARD O. HULBURT.

REFERENCES CITED

The following references are of record in the file of this patent:

UNITED STATES PATENTS

| Number | Name | Date |
|---|---|---|
| 1,385,657 | Bell et al. | July 26, 1921 |
| 2,206,036 | Herson | July 2, 1940 |
| 2,237,193 | Mobsby | Apr. 1, 1941 |

FOREIGN PATENTS

| Number | Country | Date |
|---|---|---|
| 522,890 | Great Britain | July 1, 1940 |

OTHER REFERENCES

Applications of Germicidal, Erythemal and Infrared Energy, Luckiesh, D. Van Nostrand Co., 250 Fourth Ave., New York City, page 20.

Ser. No. 326,650 (A. P. C.), published May 18, 1943.